United States Patent [19]

Tomlinson, Jr.

[11] Patent Number: 4,951,243

[45] Date of Patent: Aug. 21, 1990

[54] PROBABILISTIC PULSE TRAIN RANDOMIZATION DEVICE

[75] Inventor: Max S. Tomlinson, Jr., Carlsbad, Calif.

[73] Assignee: Analog Intelligence Corporation, Carlsbad, Calif.

[21] Appl. No.: 420,357

[22] Filed: Oct. 12, 1989

[51] Int. Cl.$^5$ .............................................. G06F 1/02
[52] U.S. Cl. ................................................... 364/717
[58] Field of Search .......................... 364/717, 715.01; 331/78; 377/39; 371/67.1, 71

[56] References Cited

U.S. PATENT DOCUMENTS

| | | | |
|---|---|---|---|
| 4,839,841 | 6/1989 | Hagen et al. | 364/717 |
| 4,852,023 | 7/1989 | Lee et al. | 364/717 |
| 4,853,884 | 8/1989 | Brown et al. | 364/717 X |
| 4,876,659 | 10/1989 | Devereux et al. | 364/717 |

Primary Examiner—Gary V. Harkcom
Assistant Examiner—Tan V. Mai
Attorney, Agent, or Firm—Calif Kip Tervo

[57] ABSTRACT

A device for re-randomizing probabilistic pulse trains. The device receives an input probabilistic pulse train and produces an output probabilistic pulse train of equal value, but which is statistically independent from the input probabilistic pulse train. The device generally comprises an up/down counter and a comparator. The up/down counter keeps track of the difference between the number of input pulses and the number of output pulses. The comparator produces output pulses, generally with the probability of pulses being generated positively related to the value of the difference.

3 Claims, 2 Drawing Sheets

PROBABILISTIC PULSE TRAIN RANDOMIZATION DEVICE

BACKGROUND OF THE INVENTION

I. Field of Invention

The invention relates in general to a device for randomizing a probabilistic pulse train. More specifically, the device receives as input a probabilistic pulse train and outputs a randomized probabilistic pulse train of identical data value wherein the probability of output pulses occurring are identical, but the output is statistically independent of the input.

II. Background Art

A data value may be transmitted on a line in the form of a probabilistic pulse train, i.e. a pulse train wherein the data value is represented by the probability of the line being active ("on", high, one, also inverted). In the course of computation using probabilistic pulse trains, often it is necessary for the probabilistic pulse trains on separate lines to be statistically independent. Also, sometimes, during the course of computation, results on separate lines to become statistically dependent.

As an example, if the values X, A and B are represented by statistically independent pulse trains to calculate AX and BX, by simply logically AND'ing the appropriate pulse trains. However, the logical AND'ing of statistically dependent pulse trains does not result in a proper multiplication. Because both the logical AND's utilize the same probabilistic pulse train X, the resultant probabilistic pulse trains AX and BX are not statistically independent. Therefore, if they are to be used in situations which require statistical independence, such as producing the product $ABX^2$, the AX and BX signals cannot be simply AND'ed. Hence, to calculate $ABX^2$, it is necessary to "re-randomize" AX, BX, or both, by changing one or both of the probabilistic pulse trains AX and BX such that they are statistically independent of one another.

Therefore there is a need for a re-randomization circuit.

SUMMARY OF INVENTION

This invention is a device for re-randomizing probabilistic pulse trains. The device receives an input probabilistic pulse train and produces an output probabilistic pulse train of equal value, but which is statistically independent from the input probabilistic pulse train. The device generally comprises an up/down counter and a comparator. The up/down counter keeps track of the difference between the number of input pulses and the number of output pulses. The comparator produces output pulses, generally with probability of pulses being generated positively to the value of the difference.

DETAILED DESCRIPTION OF THE PREFERRED EMBODIMENTS

A probabilistic pulse train is active some percentage of the time. The percentage active is equal to the value that the pulse train is representing. To transform one probabilistic pulse train into another which is statistically independent the percentage active must remain the same, but the exact distribution of the pulses should be different.

A theoretical method whereby a pulse train can be randomize uses two accumulators, a subtractor, a comparator and random numbers. One accumulator counts the number of incoming pulses, and the other counts the number of outgoing pulses. The subtractor calculates the difference between the number of incoming and outgoing pulses. When the subtractor says that the difference is zero, no pulses should be sent out, because more pulses would go out than have come in. When the difference is high, allot of pulses should be sent out to catch up. To create output pulses, the comparator compares the difference and a random number. If the random number is less than the difference a pulse is generated. Threfore if the difference is small, there will be a low probability that a pulse will be output. If the difference is large, there will be a high probability that a pulse will be output. Note that if a large number of pulses are sent in, and then a long settling time goes by, such that the difference goes back to zero, the number of pulses in will exactly equal the number of pulses output. Furthermore, if the comparator is made such that it will always generate a pulse when the difference gets to a certain number, the size of the difference can be constrained (to that number). Unfortunately, this theoretical method cannot be implemented, as the accumulators would need to be infinitely large.

In the present invention instead of using two accumulators, a single up/down counter is used. This counter would increment when an incoming pulse is seen, and decrement when an output pulse is seen. If neither incoming nor outgoing pulse is seen, the counter's value would not be changed. If both incoming and outgoing pulse are seen the counter's value would not be changed. This gives a simple method of deriving the difference.

Figure 2:
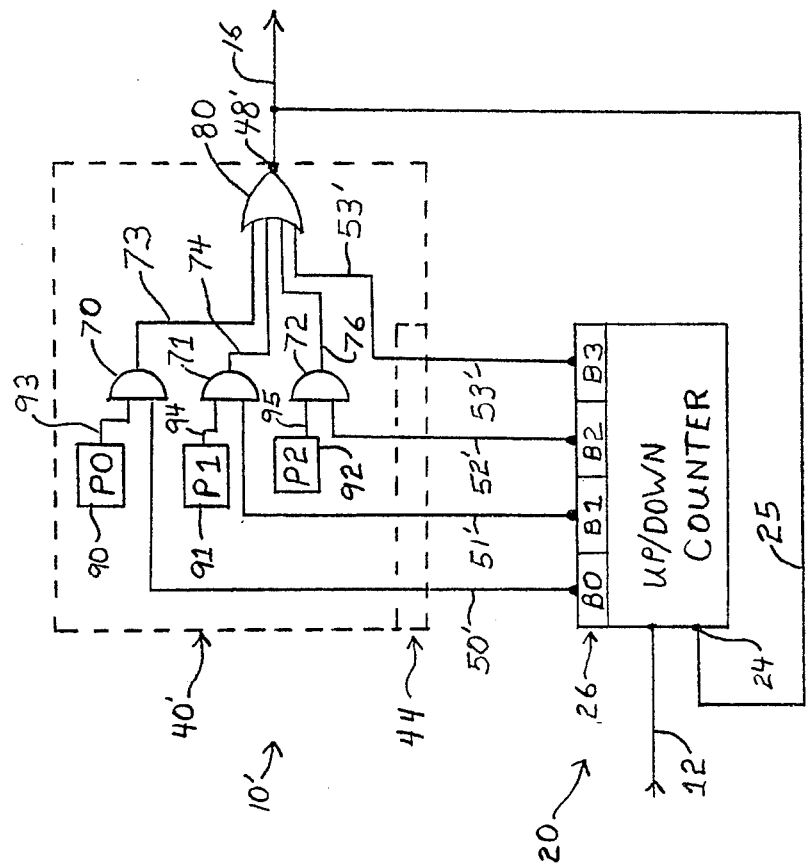
FIG. 2 is a block diagram of an alternate embodiment of the invention.

Furthermore, instead of using a linear comparator, simpler comparators can be utilized. The circuit in FIG. 2 gives one such method. If P0 has a probability of $\frac{1}{8}$ of being on, P1 has a probability of $\frac{1}{4}$ of being on, and P2 has a probability of $\frac{1}{2}$ of being on, the probability of an output pulse is as follows:

| MSB | | LSB | | Output | Probability |
| --- | --- | --- | --- | --- | --- |
| 0 | 0 | 0 | 0 | 0 | 0 |
| 0 | 0 | 0 | 1 | P0 | $\frac{1}{8}$ |
| 0 | 0 | 1 | 0 | P1 | $\frac{1}{4}$ |
| 0 | 0 | 1 | 1 | P1 or P0 | $\frac{3}{8}$ |
| 0 | 1 | 0 | 0 | P2 | $\frac{1}{2}$ |
| 0 | 1 | 0 | 1 | P2 or P0 | $\frac{5}{8}$ |
| 0 | 1 | 1 | 0 | P2 or P1 | $\frac{3}{4}$ |
| 0 | 1 | 1 | 1 | P2 or P1 or P0 | $\frac{7}{8}$ |
| 1 | X | X | X | 1 | 1 |

This gives a nearly linear comparison with building a linear comparator.

Figure 1:
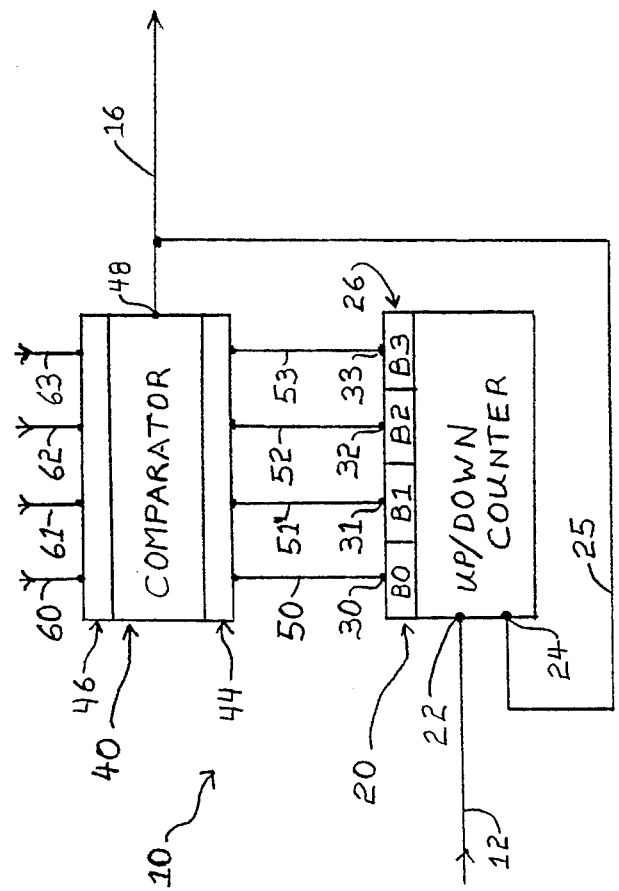
FIG. 1 is a block diagram of a preferred embodiment of the Probabilistic Pulse Train Randomization Device, of the present invention.

With reference now to the drawings, there is illustrated in FIG. 1 a block diagram of the preferred embodiment of the probabilistic pulse train Randomizing Device, denoted generally as 10, of the present invention. Randomization device 10 generally comprises up/down countermeans, denoted generally as 20, and comparator means, denoted generally as 40.

Input line 12 carries the input probabilistic pulse train. Output line 16 carries the resultant randomized output probabilistic pulse train.

Up/down counter means 20 generally includes increment input port means 22 for receiving the input probabilistic pulse train, decrement input port means 24 connected by feedback line 25 to output line 16 for receiving the randomized output probabilistic pulse train, storage means 26 for storing a value of two or more bits, and a plurality of storage output port means 30,31,32,33. In the exemplary embodiment, the stored value has four bits: least significant bit B0, second bit B1, third bit B2 and most significant bit B3. Each storage output port means 30,31,32,33 is connected to one bit B0,B1,B2,B3 of the stored value each storage output port means for transmitting its corresponding bit. Up/down counter 20 increments the stored value if increment port 22 receives a pulse and decrement port 24 does not receive a pulse. Up/down counter 20 decrements the stored value if decrement port 24 receives a pulse and increment port 22 does not receive a pulse.

The up/down counter described above is similar to the industry standard 74190. To make an exact circuit, the enable bar input of the 74190 should be the exclusive-nor of increment port 22 and decrement port 24, and the up/down-input of the 74190 should be tied to increment port 22. Obviously, many other circuits are possible.

Comparator 40 generally includes first input port means 44 connected to the plurality of storage output ports 30,31,32,33 by stored value lines 50,51,52,53 for receiving the stored value, second input port means 46 for receiving the random number on random number lines 60,61,62,63 and comparator output port means 48. Comparator 40 produces on the comparator output port 48 an output probabilistic pulse train such that the produced output train always has a pulse when the stored value is at its largest possible value, never has a pulse when the stored value is at its smallest possible value, and otherwise has pulses dependent on the random number and the stored value.

Comparator output 48 transmits the output probabilistic pulse train onto output line 16.

There are many possible circuits that could be used to implement comparator 40, as long as the boundary conditions detailed above are maintained. A typical circuit would be to use a four bit magnitude comparator, such as the industry standard 7485, with a few external components (for the check for the upper boundary condition).

Fig. 2 is a block diagram of an alternate preferred embodiment of the probabilistic pulse train randomization device.

The embodiment of FIG. 2 is similar to that of FIG. 1, except that the comparator is implemented in quite a different manner. Input line 12, output line 16, and up/down counter 20 are the same as in FIG. 1.

Comparator means, shown generally as 40', generally includes: first input port means 44'; comparator output port means 48'; a plurality of AND gate means, such as first AND gate 70, second and gate 71, and third and gate 72; OR gate means, such as OR gate 80; and a plurality of statistically independent random number source means such as random pulse train generators, first random pulse train generator 90, second random pulse train generator 91, and third random pulse train generator 92, each random pulse train generator produces a probabilistic pulse train of some represented value. AND gates 70,71,72, are connected by stored value lines 50', 51', 52', respectively to stored value bits B0,B1,B2, also respectively. and by lines 93,94,95 to random pulse train generators 90,91,92, also respectively. No AND gate is connected to the most significant bit, B3. Each AND gate 70,71,82 outputs a signal that is the logical AND of its inputs on lines 73,74,75 respectively. OR gate means, such as OR gate 80 receives as input all of the produced AND signals on lines 73,74,75 and the most significant bit B3 of the stored value and produces the logical OR thereof at comparator output port 48'.

Random pulse generators 90,91,92, can be thought of as each generating a bit of a random number. If the probabilities of lines 90,91,92 are not $\frac{1}{2}$, then the probability density function of the produced random numbers is obviously not even.

Although particular embodiments of the invention have been illustrated and described, various changes may be made in the form, arrangement, convention and selection of the elements herein without sacrificing any of its advantages. Therefore, it is to be understood that all matter herein is to be interpreted as illustrative and not in any limiting sense, and the appended claims are intended to cover such modifications and changes as come within the true spirit and scope of the invention.

What I claim is:

1. A probabilistic pulse train randomization device for randomizing a probabilistic pulse train, for receiving an input probabilistic pulse train, for receiving a random number, and for outputting an output probabilistic pulse train that is a function of the input probabilistic pulse train, but is statistically independent from the input probabilistic pulse train comprising:

up/down counter means including:
  increment input port means for receiving the input probabilistic pulse train,
  decrement input port means connected to a comparator output port means for receiving the output probabilistic pulse train,
  storage means for storing a value of two or more bits, and
  plurality of storage output port means,
    each connected to one bit of the stored value of said storage means and
    each for transmitting its corresponding bit of the stored value;
said up/down counter means
  for incrementing the stored value
    if said increment input port means receives a pulse and said decrement input port means does not receive a pulse, and
  for decrementing the stored value
    if said decrement input port means receives a pulse and said increment input port means does not receive a pulse;
and comparator means including:
  first input port means connected to said plurality of storage output port means for receiving the stored value,
  second input port means for receiving the random number, and
  comparator output port means for transmitting the output probabilistic pulse train;
said comparator means for
  producing on said comparator output port means the output probabilistic pulse train,
    such that the produced output probabilistic train
      always has a pulse when the stored value is at its largest possible value, never has a pulse when the stored value is at its smallest possible value, and otherwise has pulses dependent on the random number and the stored value.

2. The device of claim 1, wherein said comparator further comprises:

one or more AND gate means
- each connected to said first input port means,
- each for receiving a different bit of the stored value except for the most significant bit of the second value,
- each connected to said second input port means,
- each for receiving a different bit of the random number, and
- each for producing an AND signal which is the logical AND of its corresponding input bits, and an OR gate means
- connected to all said AND gate means,
- for receiving all said AND signals from said AND gate means,
- connected to said first input port means,
- for receiving the most significant bit of the stored value and
- for producing on said comparator output port means, as the logical OR thereof,
- the output probabilistic pulse train.

3. The device of claim 1, wherein
said otuput probabilistic pulse train produced by said comparator means produces a pulse on said comparator output port means
- if the random number is numerically less than the stored value or
- if the stored value is at its largest possible value.

* * * * *